US012126156B2

(12) United States Patent
Kato et al.

(10) Patent No.: US 12,126,156 B2
(45) Date of Patent: Oct. 22, 2024

(54) FIXING STRUCTURE OF WIRING MEMBER, AND WIRING MEMBER WITH JOINT MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hirotaka Kato, Mie (JP); Hiroki Hirai, Mie (JP); Makoto Higashikozono, Mie (JP); Kosuke Sone, Mie (JP); Hirokazu Komori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 124 days.

(21) Appl. No.: 17/768,776

(22) PCT Filed: Aug. 21, 2020

(86) PCT No.: PCT/JP2020/031624
§ 371 (c)(1),
(2) Date: Apr. 13, 2022

(87) PCT Pub. No.: WO2021/084866
PCT Pub. Date: May 6, 2021

(65) Prior Publication Data
US 2023/0027968 A1    Jan. 26, 2023

(30) Foreign Application Priority Data
Oct. 28, 2019   (JP) .................... 2019-194981

(51) Int. Cl.
*H02G 3/30*    (2006.01)
*C09J 7/35*    (2018.01)
(Continued)

(52) U.S. Cl.
CPC ............. *H02G 3/305* (2013.01); *H05B 6/105* (2013.01)

(58) Field of Classification Search
CPC .......... H02G 3/305; H02G 3/02; H05B 6/105; C09J 7/35; C09J 7/38; H01B 7/40; H01B 7/0846; B60R 16/0207; B60R 16/0215
See application file for complete search history.

(56) References Cited

U.S. PATENT DOCUMENTS

| | | | |
|---|---|---|---|
| 2019/0279787 A1 | 9/2019 | Yamaguchi | |
| 2020/0172027 A1 | 6/2020 | Mizuno et al. | |

FOREIGN PATENT DOCUMENTS

| | | |
|---|---|---|
| CN | 204230234 | 3/2015 |
| CN | 109791818 | 5/2019 |

(Continued)

OTHER PUBLICATIONS

China Office Action received in CN Application No. 202080075228.0, dated Oct. 7, 2023.
(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A fixing structure of a wiring member includes: a wiring member including at least one wire-like transmission member; a joint member including an adhesive layer, a heat generation layer, and a joint layer; and an adherend to which the wiring member is fixed, wherein the heat generation layer is a layer which can generate heat by induction heating (Continued)

and is provided between the adhesive layer and the joint layer, the joint layer is a layer having bond properties when heat is transmitted from the heat generation layer at a time of induction heating, the adhesive layer is fixed to one of the wiring member and the adherend, and the joint layer is fixed to another one of the wiring member and the adherend.

3 Claims, 3 Drawing Sheets

(51) Int. Cl.
*C09J 7/38* (2018.01)
*H01B 7/40* (2006.01)
*H02G 3/02* (2006.01)
*H05B 6/10* (2006.01)

(56) References Cited

FOREIGN PATENT DOCUMENTS

| JP | 10-279892 | 10/1998 | | |
| JP | 2000-264137 A | 9/2000 | | |
| JP | 2002-112440 A | 4/2002 | | |
| JP | 2002-371253 A | 12/2002 | | |
| KR | 2006116976 A | * | 11/2006 | ............ C09J 7/0292 |
| WO | 2018/235788 A1 | 12/2018 | | |

OTHER PUBLICATIONS

International Search Report issued in International Pat. Appl. No. PCT/JP2020/031624, dated Oct. 20, 2020, English translation.
International Preliminary Report on Patentability issued in International Pat. Appl. No. PCT/JP2020/031624, dated Jul. 9, 2021, English translation.
Office Action, Japan Patent Office, in counterpart Japanese Patent Application No. 2019-194981, issued on Jan. 31, 2023, with English translation.
Office Action issued in Corresponding CN Patent Application No. 202080075228.0, dated Apr. 24, 2024, along with an English translation thereof.
Office Action issued in Corresponding CN Patent Application No. 202080075228.0, dated Jul. 8, 2024, along with an English translation thereof.

* cited by examiner

FIXING STRUCTURE OF WIRING MEMBER, AND WIRING MEMBER WITH JOINT MEMBER

TECHNICAL FIELD

The present disclosure relates to a fixing structure of a wiring member and a wiring member with a joint member.

BACKGROUND ART

Patent Document 1 discloses a technique of attaching and fixing a wire harness to a molded ceiling by a double-sided adhesive tape.

PRIOR ART DOCUMENTS

Patent Documents

Patent Document 1: Japanese Patent Application Laid-Open No. 2000-264137

SUMMARY

Problem to be Solved by the Invention

In a case of Patent Document 1, there is a possibility that a dust, for example, adheres to a double-sided adhesive tape attached to a molded ceiling and tacky adhesion decreases. In order to prevent such a decrease in tacky adhesion, it is necessary to provide a releasing paper on the double-sided adhesive tape attached to the molded ceiling, or provide the double-sided adhesive tape on the molded ceiling and immediately attach the wire harness. In the former case, a process of removing the releasing paper at the time of attaching the wire harness is necessary. The latter case may cause a limitation in an assembly process.

Accordingly, an object is to provide a technique of achieving a simple fixation of a wiring member and an adherend.

Means to Solve the Problem

A fixing structure of a wiring member according to the present disclosure is a fixing structure of a wiring member including: a wiring member including at least one wire-like transmission member; a joint member including an adhesive layer, a heat generation layer, and a joint layer; and an adherend to which the wiring member is fixed, wherein the heat generation layer is a layer which can generate heat by induction heating and is provided between the adhesive layer and the joint layer, the joint layer is a layer having bond properties when heat is transmitted from the heat generation layer at a time of induction heating, the adhesive layer is fixed to one of the wiring member and the adherend, and the joint layer is fixed to another one of the wiring member and the adherend.

Effects of the Invention

According to the present disclosure, the wiring member and the adherend are simply fixed to each other.

DESCRIPTION OF EMBODIMENT(S)

Description of Embodiment of Present Disclosure

Figure 1:
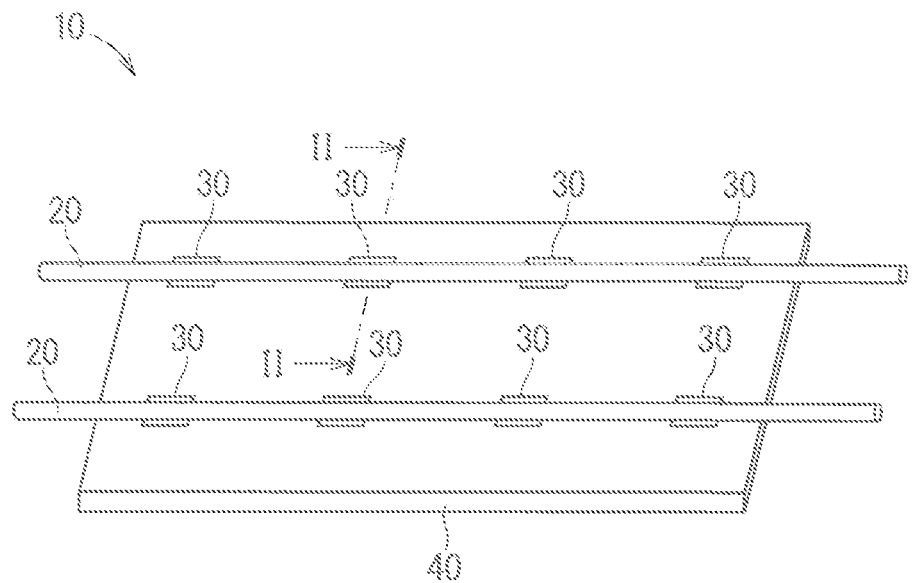
FIG. 1 is a perspective view illustrating a fixing structure of a wiring member according to an embodiment 1.

Embodiments of the present disclosure are listed and described firstly.

A fixing structure of a wiring member according to the present disclosure is as follows.

(1) A fixing structure of a wiring member includes: a wiring member including at least one wire-like transmission member; a joint member including an adhesive layer, a heat generation layer, and a joint layer; and an adherend to which the wiring member is fixed, wherein the heat generation layer is a layer which can generate heat by induction heating and is provided between the adhesive layer and the joint layer, the joint layer is a layer having bond properties when heat is transmitted from the heat generation layer at a time of induction heating, the adhesive layer is fixed to one of the wiring member and the adherend, and the joint layer is fixed to another one of the wiring member and the adherend. The wiring member and the adherend are fixed to each other via the joint member. The joint member is simply fixed to one of the wiring member and the adherend by the adhesive layer. The joint layer does not need a releasing paper. The joint layer can be heated by induction heating using the heat generation layer at an optional time. Accordingly, the wiring member and the adherend are simply fixed to each other.

(2) It is also applicable that the adhesive layer is fixed to the wiring member and the joint layer is fixed to the adherend. Accordingly, the joint member is simply provided on the wiring member firstly.

(3) It is also applicable that the adhesive layer is fixed to the adherend and the joint layer is fixed to the wiring member. Accordingly, the joint member is simply provided on the adherend firstly.

(4) The joint member may be partially provided along a longitudinal direction of the wiring member. A region where the joint member is provided is reduced, thus weight saving and cost reduction can be achieved, for example.

(5) The joint member may be provided to extend on the adherend. Accordingly, the wiring member and the adherend are easily joined to each other.

(6) The joint member may be wound around the wiring member. Accordingly, the joint member and the wiring member are easily joined to each other.

(7) A wiring member with a joint member according to the present disclosure is a wiring member with a joint member including: a wiring member including at least one wire-like transmission member; and a joint member including an adhesive layer, a heat generation layer, and a joint layer, wherein the heat generation layer is a layer which can generate heat by induction heating and is provided between the adhesive layer and the joint layer, the joint layer is a layer having bond properties when heat is transmitted from the heat generation layer at a time of induction heating, the adhesive layer is fixed to the wiring member, and the joint layer is exposed. The adhesive layer is fixed to the wiring member, thus the joint member is simply fixed to the wiring member. The joint layer having bond properties by induction heating using the heat generation layer is joined to the adherend in a state where the wiring member is wired on the adherend, thus the wire-like transmission member and the adherend are simply fixed to each other.

Details of Embodiment of Present Disclosure

Specific examples of a fixing structure of a wiring member of the present disclosure are described hereinafter with reference to the drawings. The present disclosure is not limited to these examples, but is indicated by claims, and it is intended that meanings equivalent to claims and all modifications within a scone of claims are included.

Embodiment 1

Figure 2:
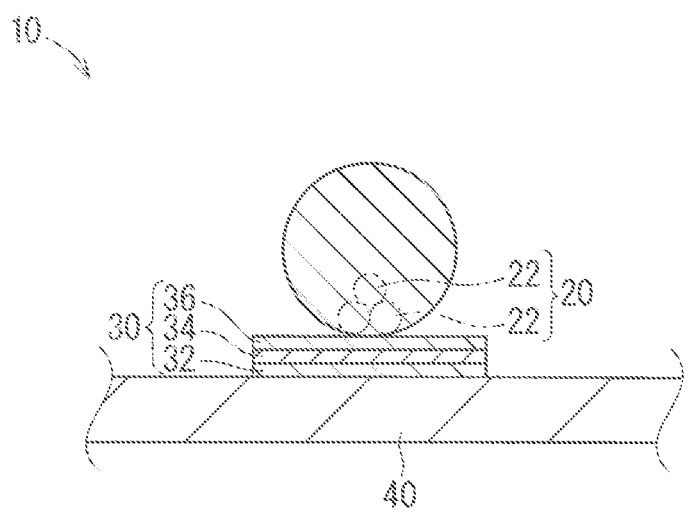
FIG. 2 is a cross-sectional view along a II-II line in FIG. 1.

A fixing structure of a wiring member according to an embodiment 1 is described hereinafter. FIG. 1 is a perspective view illustrating a fixing structure 10 of a wiring member according to the embodiment 1. FIG. 2 is a cross-sectional view along a II-II line in FIG. 1.

The fixing structure 10 of the wiring member includes a wiring member 20, a joint member 30, and an adherend 40.

The wiring member 20 is mounted to a vehicle. The wiring member 20 is a wiring transmitting electrical power or light, for example, to each component provided in the vehicle. The plurality of (two in the example illustrated in FIG. 1) wiring members 20 are provided, however, the number thereof may be one. The wiring member 20 is linearly disposed on the adherend 40. The wiring member 20 may be curved and disposed on the adherend 40. The wiring member 20 is not branched on the adherend 40. The wiring member 20 may be branched on the adherend 40. The plurality of wiring members 20 are parallel to each other on the adherend 40. The plurality of wiring members 20 may not be parallel to each other on the adherend 40. Each wiring member 20 includes at least one wire-like transmission member 22.

The wire-like transmission member 22 may be a wire-like member transmitting electrical power or light, for example. The wire-like transmission member 22 includes a transmission wire body transmitting electrical power or light, for example. The wire-like transmission member 22 may include a covering layer covering the transmission wire body. For example, the wire-like transmission member 22 may be a covering wire, a bare conductive wire, a shielded wire, a twisted wire, an enamel wire, a nichrome wire, or an optical fiber.

Herein, each wiring member 20 includes a plurality of wire-like transmission members 22. The wiring member 20 may include an exterior member. The exterior member is a member covering the plurality of wire-like transmission members 22. The external member may be a sheet. The sheet is a member wound around the plurality of wire-like transmission members 22, for example. The exterior member may be a tube or a protector, for example. The tube or a protector is a member housing the plurality of wire-like transmission members 22. The external member may be a banding member. The banding member is a member banding the plurality of wire-like transmission members 22. An adhesive tape or a banding band, for example, may be adopted as the banding member.

The joint member 30 includes an adhesive layer 32, a heat generation layer 34, and a joint layer 36. The adhesive layer 32, the heat generation layer 34, and the joint layer 36 are stacked in this order. That is to say, the heat generation layer 34 is provided between the adhesive layer 32 and the joint layer 36.

The adhesive layer 32 is a layer provided with a gluing agent and can adhere (capable of perform pressure-sensitive adhesion). The gluing agent is formed of a material having tacky adhesion at room temperature. A type of the gluing agent is not particularly limited, but can be appropriately selected in accordance with a material of an adhesion target and a required fixing strength, for example. For example, the gluing agent may be a rubber type agent or resin of acrylic, for example.

The heat generation layer 34 is a layer which can generate heat by induction heating. For example, the heat generation layer 34 is a conductive layer formed of a conductive foil such as an aluminum foil or a copper foil as a material. The induction heating is a heating method using electromagnetic induction. The heat generation layer 34 generates heat by the induction heating as described hereinafter. That is to say, the induction heating generates change of magnetic field passing through the heat generation layer 34. For example, high frequency current flows in a position located away from the heat generation layer 34, thus a change of the magnetic field passing through the heat generation layer 34 is generated. Induction current (eddy current) flows in the heat generation layer 34 by the change of the magnetic field passing through the heat generation layer 34. Joule heal is generated in the heat generation layer 34 in accordance with the induction current. The heat generation layer 34 generates heat by the Joule heat.

The adhesive layer 32 is provided on a side of one main surface of the heat generation layer 34, and the joint layer 36 is provided on a side of the other main surface. Thus, the heat generation layer 34 can be also considered a base material of the adhesive layer 32 and the joint layer 36.

The joint layer 36 is a layer having the bond properties when heat is transmitted from the heat generation layer 34 at a time of induction heating. The joint layer 36 is formed of a material corresponding to a material of a joint target (the heat generation layer 34, the wiring member 20, and the adherend 40) and a required joint strength, for example.

For example, the joint layer 36 may be a layer which is melt by heat transmitted from the heat generation layer 34 at the time of the induction heating and can be joined. In this case, thermoplastic resin may be a material of the joint layer 36. The joint layer 36 may be a hot-melt adhesive agent. Moreover, for example, the joint layer 36 may also be a thermoset adhesive agent. The joint layer 36 may be formed so that a surface thereof is not sticky as much as possible at room temperature. It is preferable that a releasing paper is unnecessary in the joint layer 36.

The adherend 40 is a member provided in a vehicle. The adherend 40 may be an interior member such as a roof trim or a door trim. The adherend 40 may be a body part constituting a framework of a vehicle body. The adherend 40 may be a body panel such as a roof panel or a door panel. The wiring member 20 is fixed on a fixation surface of the adherend 40. Herein, the fixation surface of the adherend 40 is a planar surface, however, a curved surface may also be applicable. The fixation surface of the adherend 40 may be made of resin or metal.

The wiring member 20 is fixed to the adherend 40 via the joint member 30. The adhesive layer 32 is fixed to one of the wiring member 20 and the adherend 40, and the joint layer 36 is fixed to the other one of the wiring member 20 and the adherend 40. In the present example, the adhesive layer 32 is fixed to the adherend 40, and the joint layer 36 is fixed to the wiring member 20. It is also applicable that the adhesive layer 32 is fixed to the wiring member 20, and the joint layer 36 is fixed to the adherend 40. In the present example, the joint member 30 is provided to extend on the adherend 40.

The joint member 30 is partially provided along a longitudinal direction of the wiring member 20. The joint member 30 is provided to overlap with part of a portion of the wiring member 20 wired on the adherend 40. The joint member 30 fixes a plurality of positions (herein, four positions) at intervals along the longitudinal direction in the wiring member 20 to the adherend 40.

The portion of the wiring member 20 provided with an exterior member may be fixed to the adherend 40. The portion of the wiring member 20 where an exterior member is not provided and the plurality of wire-like transmission members 22 are exposed may be fixed to the adherend 40.

In the example illustrated in FIG. 2, an exterior member having a planar surface is not provided in a portion of the wiring member 20 provided with the joint member 30. The wiring member 20 and the adherend 40 do not have surface contact with each other in a portion of the wiring member 20 fixed to the adherend 40 via the joint member 30. The exterior member having the planar surface may be provided in the portion of the wiring member 20 provided with the joint member 30. The wiring member 20 and the adherend 40 may have surface contact with each other in the portion of the wiring member 20 fixed to the adherend 40 via the joint member 30.

Figure 3:
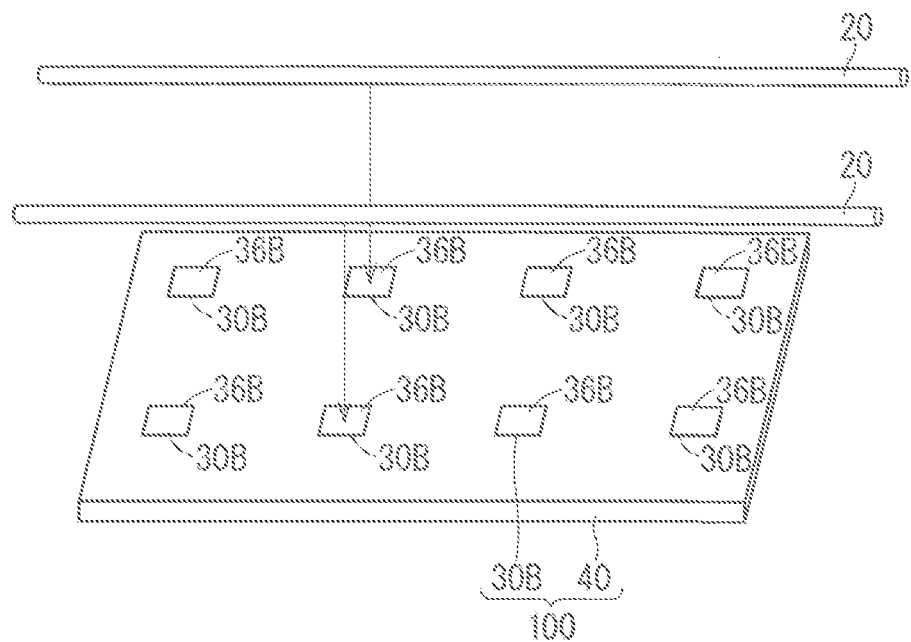
FIG. 3 is an explanation diagram illustrating the wiring member fixed to the adherend.

FIG. 3 is an explanation diagram illustrating the wiring member 20 fixed to the adherend 40. It is preferable that when the wiring member 20 is fixed to the adherend 40 via the joint member 30, after the adhesive layer 32 is fixed to a fixing target firstly, the joint layer 36 is heated and fixed to the fixing target.

In the example illustrated in FIG. 3, the joint member 30 is fixed to the adherend 40 before being fixed to the wiring member 20. Herein, the adhesive layer 32 is fixed to the adherend 40. Accordingly, the joint layer 36B is exposed in the joint member 30B. The joint member 30B and the joint layer 36B are in a state before the joint layer 36B is fixed to a fixing target (the wiring member 20 herein). A configuration similar to that of the joint member 30 and the joint layer 36 described above can be adopted to the joint member 30B and the joint layer 36B except that the joint layer 36B is not fixed to the fixing target (the wiring member 20 herein). The adherend 40 provided with the joint member 30B may also be referred to as the adherend with the joint member 100.

The wiring member 20 is wired to overlap with the joint layer 36B, and joint layer 36B has bond properties when induction heating is performed by the heat generation layer 34. Accordingly, the joint layer 36 thereby having the joint properties is joined to the wiring member 20 and fixed. Any of the wiring of the wiring member 20 and induction heating of the heat generation layer 34 may be performed firstly, or they may be performed at the same time.

According to the fixing structure 10 of the wiring member having the configuration described above, the wiring member 20 and the adherend 40 are fixed to each other via the joint member 30. The joint member 30 is simply fixed to on of the wiring member 20 and the adherend 40 by the adhesive layer 32. The joint layer 36 does not need a releasing paper. The joint layer 36B has the bond properties when induction heating is performed using the heat generation layer 34 at an optional time. Accordingly, the wiring member 20 and the adherend 40 are simply fixed to each other.

The adhesive layer 32 is fixed to the adherend 40, and the joint layer 36 is fixed to the wiring member 20, thus the joint member 30 is simply provided on the adherend 40 firstly.

The joint member 30 is partially provided along the longitudinal direction of the wiring member 20, thus the region where the joint member 30 is provided is reduced, and weight saving and cost reduction can be achieved, for example.

The joint member 30 is provided to extend on the adherend 40, thus the joint member 30 and the adherend 40 are easily joined to each other.

Embodiment 2

Figure 4:
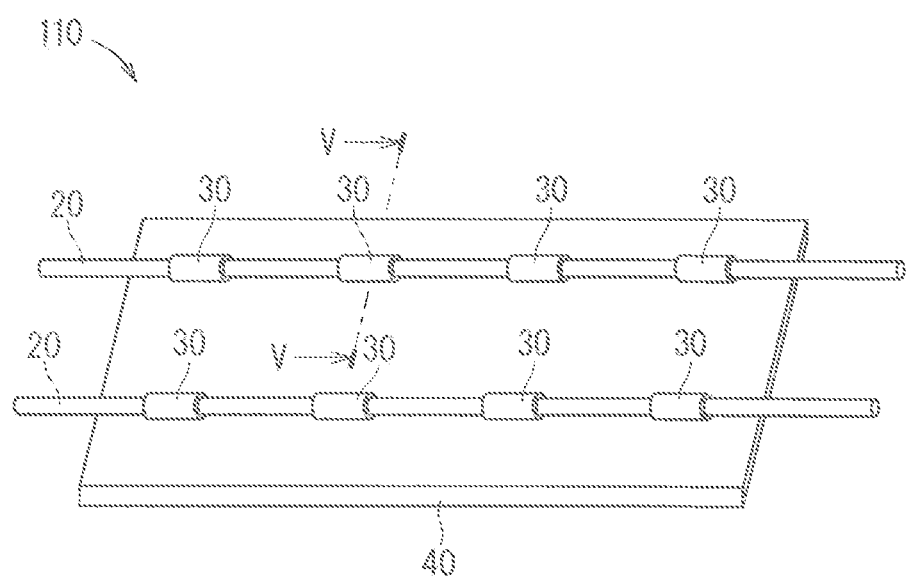
FIG. 4 is a perspective view illustrating a fixing structure of a wiring member according to an embodiment 2.
Figure 5:
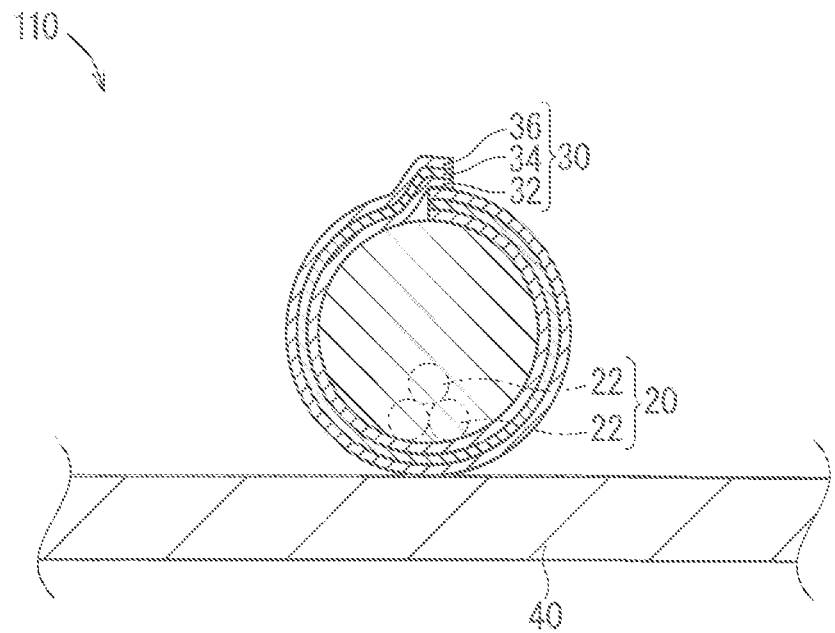
FIG. 5 is a cross-sectional view along a V-V line in FIG. 4.

A fixing structure of a wiring member according to an embodiment 2 is described. FIG. 4 is a perspective view illustrating a fixing structure 110 of the wiring member according to the embodiment 2. FIG. 5 is a cross-sectional view along a V-V line in FIG. 4. In the following description of the present embodiment, the same reference numerals are assigned to the similar constituent elements described above, and the description thereof will be omitted.

In the present example, an attachment state of the joint member 30 is different from that of the joint member 30 in the embodiment 1. Specifically, in the present example, the adhesive layer 32 is fixed to the wiring member 20, and the joint layer 36 is fixed to the adherend 40. In the present example, the joint member 30 is wound around the wiring member 20. In the example illustrated in FIG. 5, the joint member 30 is wound around the wiring member 20 for one round. A region where the joint member 30 is wound around the wiring member 20 is not particularly limited. The joint member 30 may be wound around the wiring member 20 for less than one round (for example, quarter round or half round) or more than one round. One round, half round, and quarter round do not mean one round, half round, and quarter round in a strict sense, but have a meaning with a wide range in which an effect of the present disclosure is achieved within a range considered one round, half round, and quarter round. For example, in the example illustrated in FIG. 5, the joint member 30 is wound around the wiring member 20 for slightly more than one round, and it can be considered that this state also indicates that the joint member 30 is wound around the wiring member 20 for one round.

Figure 6:
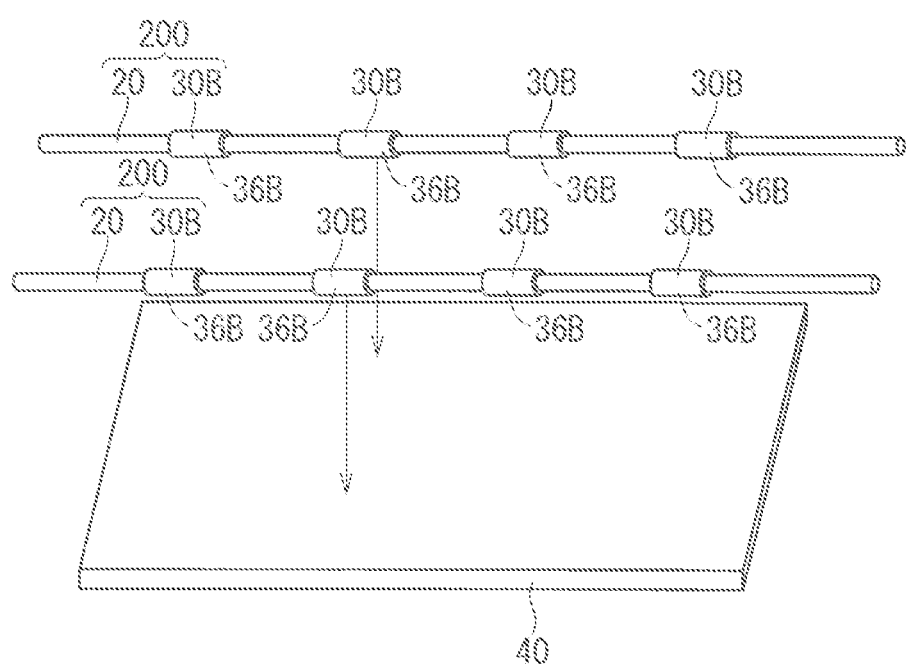
FIG. 6 is an explanation diagram illustrating the wiring member fixed to the adherend.

FIG. 6 is an explanation diagram illustrating the wiring member 20 fixed to the adherend 40.

In the example illustrated in FIG. 6, the joint member 30B is fixed to the wiring member 20 before being fixed to the adherend 40. The wiring member 20 which the joint member 30B is fixed to and which is not fixed to the adherend 40 is referred to as a wiring member with a joint member 200 hereinafter. The wiring member with the joint member 200 includes the wiring member 20 and the joint member 30B. The joint member 30B includes the adhesive layer 32, the heat generation layer 34, and the joint layer 36B. The adhesive layer 32, the heat generation layer 34, and the joint layer 36B are stocked in this order. The adhesive layer 32 is fixed to the wiring member 20. The joint layer 36B is not fixed to the adherend 40. The joint layer 36B is exposed.

The joint layer 36B has the bond properties when the wiring member with the joint member 200 is wired along a predetermined route on the adherend 40 and the heat generation layer 34 is induction heated. Accordingly, the joint layer 36 thereby having the joint properties is joined to the adherend 40 and fixed. With respect to the wiring of the wiring member with the joint member 200 and induction heating of the heat generation layer 34, the wiring may be performed firstly, induction heating may be performed firstly, or they may be performed at the same time.

The wiring member 20 and the adherend 40 are simply fixed to each other also according to the fixing structure 110 of the wiring member having the above configuration. The adhesive layer 32 is fixed to the wiring member 20, and the joint layer 36 is fixed to the adherend 40, thus the joint member 30 is simply provided on the wiring member 20 firstly.

The joint member 30 is wound around the wiring member 20, thus the joint member 30 and the wiring member 20 are easily joined to each other.

According to the wiring member with the joint member 200, the adhesive layer 32 is fixed to the wiring member 20, thus the joint member 30B is simply fixed to the wiring member 20. The joint layer 36 having bond properties by induction heating using the heat generation layer 34 is joined to the adherend 40 in a state where the wiring member 20 is wired on the adherend 40, thus the wire-like transmission member 22 and the adherend 40 are simply fixed to each other.

MODIFICATION EXAMPLE

In the embodiment 1, the joint member 30 may be wound around the wiring member 20. In the embodiment 2, the joint member 30 may extend on the adherend 40.

In each embodiment, the joint member 30 may be wholly provided along the longitudinal direction of the wiring member 20. The joint member 30 may be provided to wholly overlap with part of a portion of the wiring member 20 wired on the adherend 40 along the longitudinal direction.

In the joint member 30, the joint layer 36 may be adopted in place of the adhesive layer 32. That is to say, the joint layer 36 may be provided on both surfaces of the heat generation layer 34 in the joint member 30. It is also applicable that one of the joint layers 36 on both sides is fixed to the wiring member 20, and the other one of them is fixed to the adherend 40. In this case, the joint layers 36 on the both sides may be made up of the same type of material. The joint layers 36 on the both sides may be made up of different types of material in accordance with each joint target.

The configurations described in the embodiments and modification examples thereof can be appropriately combined as long as they are not contradictory.

EXPLANATION OF REFERENCE SIGNS 10, 110 fixing structure of wiring member
20 wiring member
22 wire-like transmission member
30, 30B joint member
32 adhesive layer
34 heat generation layer
36, 36B joint layer
40 adherend
100 adherend with joint member
200 wiring member with joint member

The invention claimed is:
1. A fixing structure of a wiring member, comprising:
a wiring member including at least one wire-like transmission member;
a joint member including an adhesive layer, a heat generation layer, and a joint layer provided in that order; and
an adherend to which the wiring member is fixed, wherein
the heat generation layer is a layer which can generate heat by induction heating and is provided between the adhesive layer and the joint layer,
the joint layer is a layer having bond properties when heat is transmitted from the heat generation layer at a time of induction heating,
the adhesive layer is a layer provided with a gluing agent formed of a material having tacky adhesion at room temperature and is fixed to the adherend, and the joint layer is fixed to the wiring member, and
the joint member is provided on the adherend to extend to be wider than a width dimension of the wiring member, and the wiring member is fixed to a part of the joint layer.
2. The fixing structure of the wiring member according to claim 1, wherein
the joint member is partially provided along a longitudinal direction of the wiring member.
3. A wiring member with a joint member, comprising:
a wiring member including at least one wire-like transmission member; and
a joint member including an adhesive layer, a heat generation layer, and a joint layer provided in that order, wherein
the heat generation layer is a layer which can generate heat by induction heating and is provided between the adhesive layer and the joint layer,
the joint layer is a layer having bond properties when heat is transmitted from the heat generation layer at a time of induction heating,
the adhesive layer is a layer provided with a gluing agent formed of a material having tacky adhesion at room temperature and is fixed to the wiring member, and the joint layer is exposed, and
the joint layer is not provided between the wiring member to which the adhesive layer is fixed and the heat generation layer.

* * * * *